US005499274A

United States Patent [19]
Brown

[11] Patent Number: 5,499,274
[45] Date of Patent: Mar. 12, 1996

[54] FRACTIONAL BIT-LEAKING CLOCK SIGNAL RESYNCHRONIZER FOR A HIGH-SPEED DIGITAL COMMUNICATIONS SYSTEM

[75] Inventor: Carlton D. Brown, Dallas, Tex.

[73] Assignee: Alcatel Network Systems, Inc., Richardson, Tex.

[21] Appl. No.: 323,031

[22] Filed: Oct. 14, 1994

[51] Int. Cl.$^6$ ............................... H04L 7/00; H03D 3/24
[52] U.S. Cl. ........................ 375/376; 375/371; 375/372
[58] Field of Search ................................ 375/371, 373, 375/372, 376; 327/141; 328/72; 331/11

[56] References Cited

U.S. PATENT DOCUMENTS

| | | | |
|---|---|---|---|
| 4,996,698 | 2/1991 | Nelson | 375/118 |
| 5,015,970 | 5/1991 | Williams et al. | 331/11 |

Primary Examiner—Stephen Chin
Assistant Examiner—Huong Luu
Attorney, Agent, or Firm—Baker & Botts

[57] ABSTRACT

A method and apparatus are provided for smoothing jitter in a smoothed clock output by routing a portion of the incoming clock signal representing phase hit information through a digital high-pass filter (12), which produces complementary output digital signals. One of the output signals includes the higher order bits of the filtered phase hit signal, and the other output signal includes the lower order bits of the filtered phase hit signal. The filtered, complementary phase hit signals are summed with the stream of clock pulses to be smoothed. Each of these summed signals is supplied to a separate phase detector circuit (120, 121). The phase detector (120) receiving the higher order bit signal generates a coarse error signal, and the phase detector (121) receiving the lower order bit signal generates a fine error signal. These fractional coarse and fine error signals are summed and converted to a high resolution analog control signal which drives a voltage controlled oscillator (50) in a phase-locked loop circuit. The phase-locked loop functions as a type two, second order low-pass filter and generates the smoothed clock output signal. An elastic buffer (18) is used to time-coordinate the incoming data signals and the smoothed clock signals output from the resynchronizer circuit (100). The phase hit adjustments are thus low-pass filtered by the phase-locked loop, which is controlled by the high resolution analog signal. Consequently, the effects of these phase adjustments on the smoothed clock output signal are introduced slowly and more evenly over a relatively longer period of time, which significantly reduces jitter as compared to existing techniques.

10 Claims, 1 Drawing Sheet

FRACTIONAL BIT-LEAKING CLOCK SIGNAL RESYNCHRONIZER FOR A HIGH-SPEED DIGITAL COMMUNICATIONS SYSTEM

TECHNICAL FIELD OF THE INVENTION

This invention relates generally to synchronous, high-speed digital communications systems, and more particularly, to an apparatus for smoothing jitter in a payload clock signal carried by a SONET (synchronous optical network) signal that has been pointer adjusted.

BACKGROUND OF THE INVENTION

In synchronous digital communications systems, such as the SONET system or its European counterpart, SDH, asynchronous rate payload signals can be mapped into the synchronous SONET or SDH payload envelope. For example, asynchronous rate $DS_x$ (DS1, DS3, etc.) type signals can be mapped onto a SONET STS-1 payload envelope. In order to synchronize the SONET signals at an asynchronous node and still generate a smooth clock signal, pointers containing a byte or word of information (typically eight bits) are used to adjust the starting point of the next SONET payload envelope so that it can move relative to the SONET frame. For a DS3 data signal, for example, the pointer will advance the address in a write counter only when DS3 data signals are input. However, these pointer adjustments that stop and start the write address counter create phase "jumps" or "hits" that occur a periodically as "jitter" in a mapped output clock signal. Furthermore, if the DS3 signal is being mapped onto a SONET STS-1 payload, the jitter problem is worsened because the starting and stopping of the write counter occurs for STS-1 signals at eight unit intervals (i.e., produces 8 UI phase jumps). Consequently, jitter approaching 7 UI (peak to peak) can occur as a result of a single STS-1 pointer adjustment (an 8 UI step at the STS-1 rate produces a time gap of 8×19.3 ns=154 ns, or approximately 7 UI at the DS3 rate). This excessive jitter in the smoothed clock output signal retards the synchronization of downstream phase-locked loops and, therefore, produces significant time delays before the DS3 channel can again deliver reliable data. This synchronization problem severely degrades the overall reliability of the communications network.

A previously developed technique uses high-pass and low-pass filters to reduce a periodic jitter components in a clock signal being resynchronized. Specifically, U.S. Pat. No. 4,996,698, which is incorporated completely herein for all purposes, discloses a clock signal resynchronizing circuit for a SONET system. The clock signal is smoothed in a gradual manner by routing the portion of the signal containing the phase hit information through a high-pass filter, and summing the output of the high-pass filter with the stream of clock pulses to be smoothed. The combined signals are then processed through a phase-locked loop circuit, which functions as a low-pass filter to produce and maintain the smoothed clock output. Consequently, the phase hit clock signal information is removed from the clock signal stream being smoothed over a relatively long period of time, which reduces jitter to some extent in the smoothed clock output signal.

FIG. 1 depicts an existing clock signal resynchronizing circuit. The resynchronizer circuit illustrated in FIG. 1 is similar to that disclosed in U.S. Pat. No. 4,996,698. However, the specific details of a filter (identified herein as item 30) having performance characteristics similar to those of integrating filter 30 disclosed in U.S. Pat. No. 4,996,698, are shown herein to help facilitate understanding the present invention described below. Referring to FIG. 1, a portion of the incoming clock signal (PP or NP) representing phase hit information is routed through a high pass filter 12 and summed with the stream of clock pulses (CLK) to be smoothed. These combined (summed) signals are supplied to a phase-locked loop, which functions as a type two, second order low-pass filter. The phase-locked loop, which has a relatively high bandwidth, produces and maintains a smoothed clock output signal. Essentially, the phase hits are low pass-filtered by the phase-locked loop, and their effects on the smoothed clock output signal are introduced slowly over a relatively long period of time. An elastic buffer 18 is used to time-coordinate incoming data signals and the smoothed clock signals output from the resynchronizer circuit depicted generally as item 10.

Using the filter circuit depicted generally as item 30 in FIG. 1, the phase hit adjustments are made in one UI steps. In other words, the phase hits are "leaked out" from summer 16 to filter 30 at the rate of one bit at a time. Therefore, the bulk of the pointer adjustments (the remaining bits comprising the pointers) are not processed all at once through the phase-locked loop, which effectively reduces jitter. Nevertheless, the bit-leaking technique disclosed in FIG. 1 still produces unacceptable levels of jitter in the smoothed output clock signal, based on the stringent output payload jitter specifications required by users of today's high-speed digital communications systems. Furthermore, these relatively high levels of jitter compound resynchronization delays that occur in cascaded SONET channels.

A second existing technique for resynchronizing clock signals uses a complicated digital filter arrangement to leak out pointer adjustment data, one bit at a time, into a phase-locked loop. The magnitude of the resulting jitter can be reduced significantly by adjusting this digital filter's bandwidth and increasing its numerical resolution. Nevertheless, although the amount of jitter experienced using this technique may be reduced to a relatively low level, the digital circuitry that is employed is very complex and expensive to implement as an integrated circuit.

SUMMARY OF THE INVENTION

Accordingly, a need exists in the high-speed digital communications industry for a clock signal resynchronizer circuit, which reduces jitter significantly in a smoothed clock signal and is also relatively inexpensive to fabricate. The present invention routes a portion of the incoming clock signal representing phase hit information through a digital high-pass filter, which produces complementary output signals. One of the output signals includes the higher order bits of the filtered phase hit signal, and the other output signal includes the lower order bits of the filtered phase hit signal. The filtered, complementary phase hit signals are summed with the stream of clock pulses to be smoothed. Each of these summed signals is supplied to a phase detector circuit. The phase detector receiving the higher order bit signal generates a coarse error signal, and the phase detector receiving the lower order bit signal generates a fine error signal. These coarse and fine error signals are summed and converted to a high resolution analog error signal which drives a voltage controlled oscillator in a phase-locked loop circuit. The phase-locked loop functions as a type two, second order low-pass filter and generates a smoothed clock output signal. An elastic buffer is used to time-coordinate the incoming data signals and the smoothed clock signals output from the resynchronizer circuit. The phase hit adjustments are thus low-pass filtered by the phase-locked loop, which is controlled by the high resolution analog error signal. Consequently, the effects of these fractional phase adjustments on the smoothed clock output signal are introduced slowly and more evenly over a relatively long period of time, which significantly reduces jitter.

An important technical advantage of the present invention is that the fractional phase adjustment technique yields about a three-fold reduction in jitter over existing techniques, and requires only about one-half the silicon area used to fabricate the more complicated digital filtering circuits.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
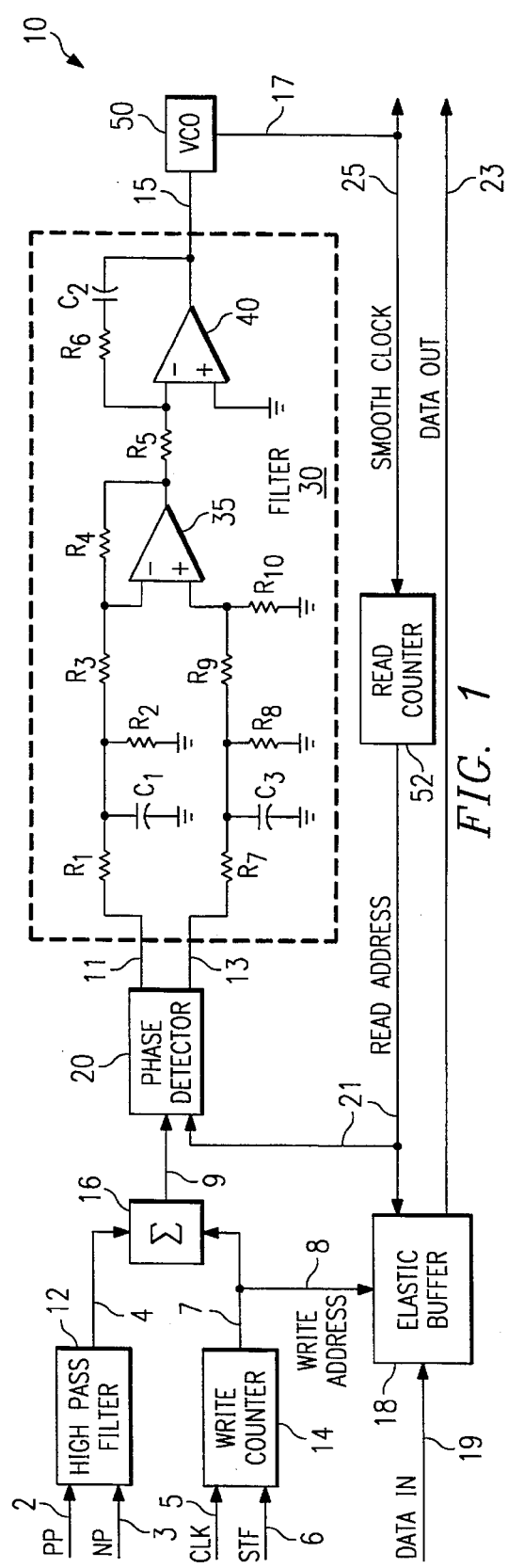
FIG. 1 illustrates an electrical schematic diagram of an existing bit-leaking clock signal resynchronizing circuit.
Figure 2:
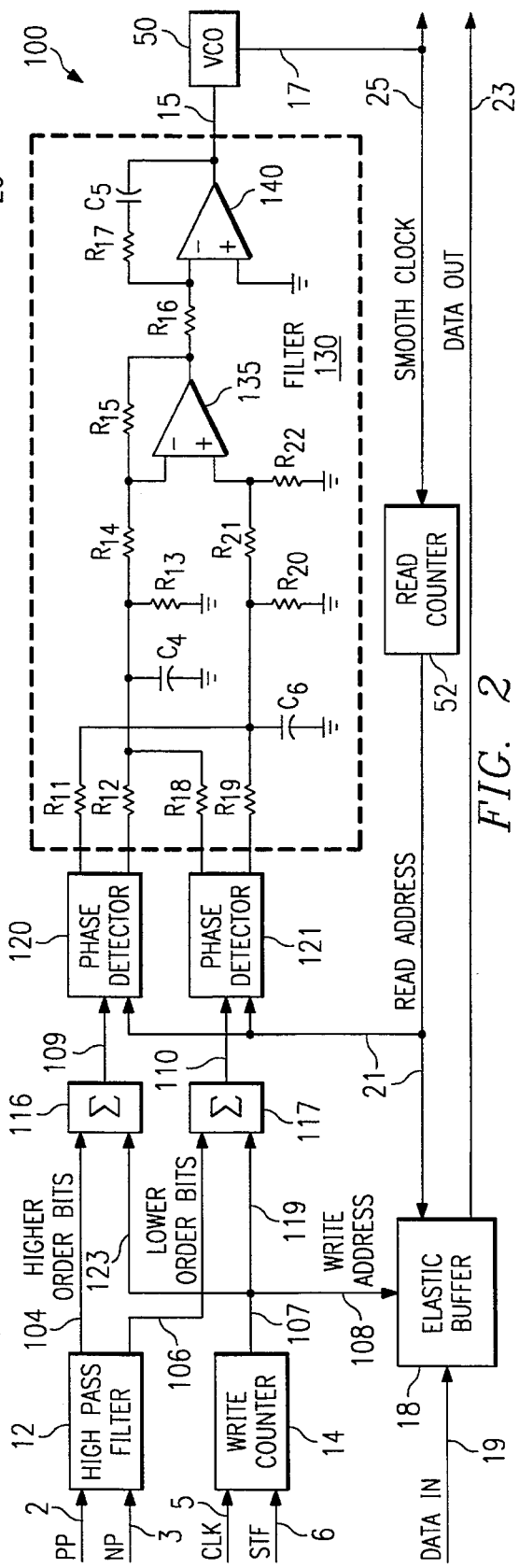
FIG. 2 illustrates an electrical circuit diagram of a preferred embodiment of a fractional bit-leaking clock signal resynchronizing apparatus structured according to the teachings of the present invention.

The preferred embodiment of the present invention and its advantages are best understood by referring to FIGS. 1 and 2 of the drawings, like numerals being used for like and corresponding parts of the various drawings.

FIG. 2 illustrates an electrical circuit diagram of a preferred embodiment of a fractional bit leaking clock signal resynchronizer apparatus structured according to the teachings of the present invention. Referring to FIG. 2, positive pointer adjustment pulses (PP) and negative pointer adjustment pulses (NP) can be input to a high-pass filter 12 via respective leads 2 and 3. The higher order bits (e.g., bits 4-7) of the filtered positive or negative pointer adjustments may be supplied via lead 104 to one input connection of higher order bit summer 116. The lower order bits (e.g., bits 0-3) of the filtered positive or negative pointer adjustments may be supplied via lead 106 to one input connection of lower order bit summer 117. Clock signals (CLK) and stuff false signals (STF) can be input to a write counter 14 via respective leads 5 and 6. The CLK signals on lead 5 occur periodically, but the presence of a STF signal on lead 6 functions to inhibit the writing of CLK signals by write counter 14 during the duration of the STF signal. The output of write counter 14 can be coupled via leads 107 and 123 to the second input connection of higher order bit summer 116, and via leads 107 and 119 to the second input connection of lower order bit summer 117. Also, the output of write counter 14 can be coupled via leads 107 and 108 to the write address input connection of an elastic buffer 18. The SONET clock (e.g., STS-1) signal can be supplied via lead 19 to the data input connection of elastic buffer 18. Therefore, for example, if the present apparatus is being used to map DS3 data onto an STS-1 payload envelope, then the STF signal is activated accordingly to inhibit write counter 14 from incrementing and outputting a write address to the elastic buffer when overhead bytes of logic are being input on lead 5. In other words, the write address in elastic buffer 18 is advanced only when DS3 data bits are present on lead 5.

From a different perspective, the overhead logic bits appearing on data input lead 19 are being refused by the elastic buffer, because write counter 14 is not incrementing the write address input to the elastic buffer while the overhead logic bits are present.

The combined signal output from summer 116 is coupled via lead 109 to one input of a phase detector 120, and the combined signal output from summer 117 is coupled via lead 110 to one input of a second phase detector 121. Phase detectors 120 and 121 comprise the initial components of a phase-locked loop, which is further comprised of integrating filter section 130, voltage controlled oscillator 50, and read counter 52 (all elements to be described in detail below). A second signal is input to each of phase detectors 120 and 121 via lead 21. The difference in phase between the two signals input to each of phase detectors 120 and 121 is detected and supplied as a separate error signal. The detected phase error signals output from phase detector 120 can be coupled to a terminal of resistors R11 and R12, and the detected phase error signals output from phase detector 121 can be coupled to a terminal of resistors R18 and R19. Resistors R11, R12, R18 and R19 comprise a resistive summing network, and in combination with capacitor C6, function as a digital to analog converter. The fractional phase error signals output from phase detector 120 represent coarse pointer phase adjustments, and those output from phase detector 121 represent fine pointer phase adjustments. These fractional phase hit error signals are used to fine tune the frequency of voltage controlled oscillator 50 in the phase-locked loop.

Specifically, for the embodiment illustrated by FIG. 2, the output error signal from phase detector 120 "leaks out" 15/16 of a bit at a time (coarse adjustment), and the error signal from phase detector 121 "leaks out" 1/16 of a bit at a time (fine adjustment), to integrating filter network 130. These digital coarse and fine error signals from phase detectors 120 and 121 are converted to analog error signals by the action of resistors R11, R12, R18, R19, C4 and C6 in integrating filter network 130 of the phase-locked loop. Although the fractional bit leaking concept of the present invention is depicted in this embodiment with the ratio of 1/16 to 15/16 bits, it is so depicted for illustrative purposes only. For example, the present fractional bit leaking concept can include ratios of 1/8 to 7/8, 3/16 to 13/16, 29/32 to 3/32, or any other appropriate ratio that functions to produce relatively high resolution error signals with coarse and fine phase error adjustments.

The summed error signals developed across capacitors C4 and C6 can be coupled to a differential amplifier 135. Specifically, the error signals developed across capacitor C4 can be coupled to the negative voltage input connection of amplifier 135, and the error signals across capacitor C6 can be coupled to the positive voltage input connection. The resulting error voltage signal output from differential amplifier 135 can be coupled to the negative voltage input connection of operational amplifier 140, which amplifies the error voltage signal to produce a control voltage to drive voltage controlled oscillator 50. Thus, filter section 130 integrates the received coarse and fine phase error signals and produces a high resolution control voltage via lead 15 to drive the frequency of VCO 50. The output signal from VCO 50 can be supplied via lead 17 both as the smoothed clock output signal, and also as an input signal to the read counter 52 via lead 25. The output of read counter 52 can supply the read address data for elastic buffer 18 and phase detectors 120 and 121 via line 21. The data in bits contained at the read address received from read counter 52 can be output from elastic buffer 18 on line 23.

In operation, if a positive pointer adjustment occurs, then the fourth byte of each subframe is used for overhead logic instead of data. Consequently, the STF signal is applied via lead 6 to write counter 14 during the fourth byte of the subframe. Since the overall length of each subframe remains constant, the amount of data carried by each subframe is thereby reduced by one byte. Consequently, a positive pointer (PP) signal is supplied via lead 2 to an input of high pass filter 12, which effectively supplies (to respective summers 116 and 117) the higher order bits and lower order bits of the count that is missing at write counter 14 due to the presence of the STF signal on lead 6. So, over the long term, the phase-locked loop eventually does not perceive the missing count, and the output signals from summers 116 and 117 represent only the output signal from write counter 14.

Initially, however, at the onset of a positive pointer adjustment, the lack of data at the inputs of phase detectors 120 and 121 caused by the missing byte, instantaneously generates an error voltage in filter 130 that reduces the frequency of the smoothed output clock signal. Alternatively, at the onset of a negative pointer adjustment, the third byte of the subframe, which typically does not contain data, is now filled with bits of data. Consequently, the additional data at the inputs of phase detectors 120 and 121 caused by the added byte from a negative pointer adjustment, instantaneously generates an error voltage in filter 130 that increases the frequency of the smoothed output clock signal. It is these instantaneous incursions in frequency (jitter) that are smoothed more rapidly and effectively than existing techniques, by using the present fractional bit leaking apparatus to "leak out" complementary fractions of bits of either missing (PP) or added (NP) bytes, which significantly increases the frequency resolution of the smoothed clock generator (VCO) circuit.

Although the present invention and its advantages have been described in detail, it should be understood that various changes, substitutions and alterations can be made herein without departing from the spirit and scope of the invention as defined by the appended claims.

What is claimed is:

1. A clock signal resynchronizer for use in a high-speed digital communications system, comprising:

a first circuit operable to receive a periodically discontinuous clock signal and output a first signal indicative of said periodically discontinuous clock signal;

a filter circuit operable to receive a phase hit adjustment signal at an input and supply a plurality of high-pass filtered output signals, said plurality of high-pass filtered output signals representing, in combination, said phase hit adjustment input signal;

a summing circuit coupled to said filter circuit and said first circuit, said summing circuit operable to sum each of said plurality of high-pass filtered signals with said first signal and supply a corresponding plurality of summed output signals;

a phase-locked loop circuit coupled to said summing circuit and operable to process said plurality of summed output signals to generate a smoothed clock signal output whose frequency is indicative of the sum of said first signal and said plurality of filtered output signals.

2. The clock signal resynchronizer according to claim 1, wherein said first circuit comprises a write counter operable to supply a write address signal representing said periodically discontinuous clock signal.

3. The clock signal resynchronizer according to claim 1, wherein said filter circuit comprises a high-pass digital filter circuit.

4. A clock signal resynchronizer for use in a high-speed digital communications system, comprising:

a first circuit operable to receive a periodically discontinuous clock signal and output a first signal indicative of said periodically discontinuous clock signal;

a filter circuit operable to receive a phase hit adjustment signal at an input and supply a plurality of high-pass filtered output signals, said plurality of high-pass filtered output signals representing, in combination, said phase hit adjustment input signal;

a summing circuit coupled to said filter circuit and said first circuit, said summing circuit operable to sum each of said plurality of high-pass filtered signals with said first signal and supply a corresponding plurality of summed output signals; and a phase-locked loop circuit comprising a plurality of phase detector circuits, each phase detector circuit corresponding to one of said plurality of summed output signals, a digital to analog converter circuit operable to convert said summed output signals to an analog control signal, and a controllable frequency signal generator operable to generate said smoothed clock output signal responsive to said analog control signal, said phase-locked loop circuit coupled to said summing circuit and operable to process said plurality of summed output signals to generate a smoothed clock signal output whose frequency is indicative of the sum of said first signal and said plurality of filtered output signals.

5. A clock signal resynchronizer for use in a high-speed digital communications system, comprising:

a digital filter circuit including at least a first input, a first output, and a second output complementary to said first output, said complementary first and second outputs indicative of said first input;

a first summation circuit and a second summation circuit, said first output coupled to an input of said first summation circuit, and said second output coupled to an input of said second summation circuit;

an elastic buffer circuit including a data input, a write address input, a read address input, and a data output, said elastic buffer operable to store data written in response to a write address provided, and transmit data read out responsive to a read address provided;

a write counter circuit including an input and output and operable to provide said write address, said output of said write counter circuit coupled to said write address input and a second input of each of said first and second summation circuits;

a first phase detector circuit and a second phase detector circuit, a first input of each said phase detector circuit coupled to a respective output of said first and second summation circuits, and an output of each said phase detector circuit coupled to a third summation circuit;

a smoothed clock generator circuit operable to generate a smoothed clock output signal responsive to combined signals received from said third summation circuit; and a read counter circuit operable to provide said read address, connected between said smoothed clock output and said read address input, and a second input of each of said phase detector circuits.

6. The clock signal resynchronizer according to claim 5, wherein said digital filter circuit further comprises a digital high pass filter.

7. The clock signal resynchronizer according to claim 5, wherein said first output is operable to provide a plurality of higher order bits representing said first input signal, and said second output is operable to provide at least a lower order bit representing said first input signal.

8. The clock signal resynchronizer according to claim 5, wherein said phase detector circuits, third summation circuit, smoothed clock generator circuit and read counter circuit comprise a phase-locked loop circuit.

9. A method of resynchronizing a clock signal in a high-speed digital communications system, comprising the steps of:

high-pass filtering phase hit adjustments to produce a first digital signal;

summing a plurality of higher order bits of said first digital signal and at least a lower order bit of said first digital signal with a periodically discontinuous clock signal;

phase detecting said summed plurality of higher order bits to produce a first error signal and said summed at least a lower order bit to produce a second error signal;

summing said first error signal with said second error signal to produce a control signal;

controlling an oscillator with said control signal to produce a smoothed clock output signal; and supplying a feedback signal indicative of the frequency of said smoothed clock output signal to be used in said phase detecting step to produce said first error signal and said second error signal.

10. A method of resynchronizing a clock signal in a high-speed digital communications system, comprising the steps of:

high-pass filtering a phase hit adjustment to produce a first digital signal and a second digital signal;

summing said first digital signal with a periodically discontinuous signal to produce a third digital signal, and summing said second digital signal with said periodically discontinuous signal to produce a fourth digital signal; and low-pass filtering said third and fourth digital signals in a phase-locked loop to generate a periodically continuous fifth signal whose frequency is indicative of the sum of said first and second digital signals and said periodically discontinuous signal.

\* \* \* \* \*